United States Patent [19]

Zulawski

[11] Patent Number: 5,038,882
[45] Date of Patent: Aug. 13, 1991

[54] SNOWMOBILE SPINDLE ARRANGEMENT

[75] Inventor: Dennis P. Zulawski, St. Hilaire, Minn. 56754

[73] Assignee: Arctco, Inc., Thief River Falls, Minn.

[21] Appl. No.: 491,515

[22] Filed: Mar. 12, 1990

[51] Int. Cl.$^5$ .............................................. B62M 27/02
[52] U.S. Cl. .................................. 180/190; 280/21.1; 280/22.1; 280/675
[58] Field of Search .................... 280/21.1, 22.1, 673, 280/675, 691; 180/182, 190

[56] References Cited

U.S. PATENT DOCUMENTS 3,883,152 5/1975 de Carbon .......................... 280/666
3,884,314 5/1975 Callaway ............................ 180/182
3,912,030 10/1975 Payne ................................ 180/182

*Primary Examiner*—Charles A. Marmor
*Assistant Examiner*—Mitchell Bompey
*Attorney, Agent, or Firm*—Jerold M. Forsberg

[57] ABSTRACT

An improved spindle arrangement for a suspension system for supporting skis of a snowmobile induces a steering bias in each of the respective skis. A spindle is attached to respective upper and lower linkages of unequal dimensions by ball joints. The ball joints attached at each respective spindle are offset from the longitudinal axis of the spindle in a manner such that a bias is induced in each respective ski causing it to toe-out. Accordingly, the bias induced in the skis creates a situation wherein the snowmobile will give the rider much more confidence and a more comfortable ride when operating the snowmobile at high speed by eliminating the disconcerting feeling that can be generated when the skis tend to toe-in.

10 Claims, 3 Drawing Sheets

FIG. 4
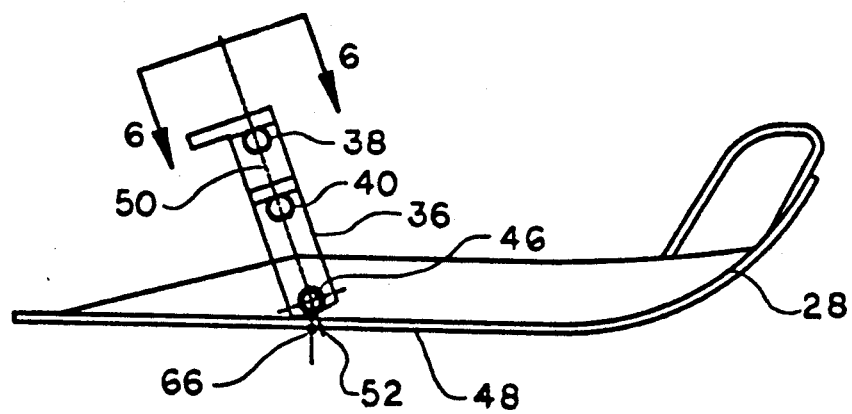
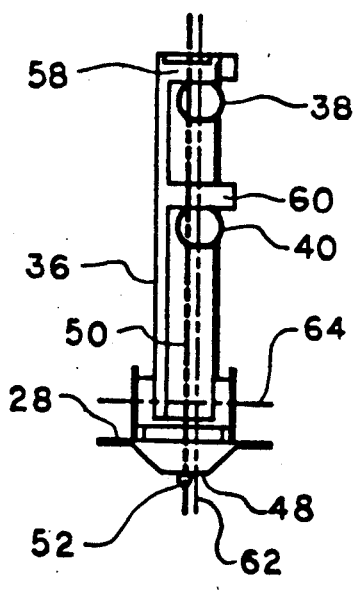
FIG. 5
FIG. 6
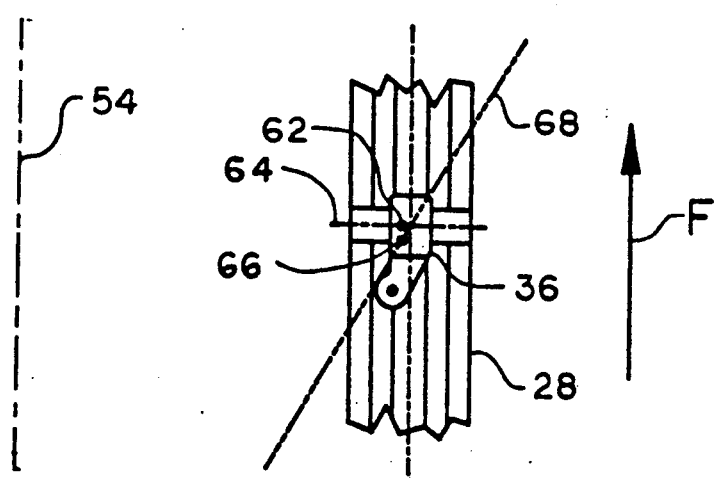

SNOWMOBILE SPINDLE ARRANGEMENT

BACKGROUND OF THE INVENTION

The present invention relates generally to an improved spindle arrangement for inclusion in a snowmobile front suspension, and more specifically to a spindle arrangement which is designed to induce a steering bias in attached skis to toe-out.

Snowmobiles typically are used over a wide variety of terrains and historically many different approaches to attaching the front skis have been used. One of the older forms of attachment of a ski includes an L-shaped spindle and is generally of the type shown by U.S. Pat. No. 3,623,563. Another prior art attachment arrangement, depicted in U.S. Pat. No. 3,912,030, shows angled spindles, offset relative to the ski such that the rotary axis of the spindle intersects the bottom of the ski at the centerline of the longitudinal tracking of the ski. Another suspension arrangement, depicted in U.S. Pat. No. 3,884,314, shows a linkage type arrangement for attachment of an angled spindle 36. This arrangement is concerned with the rapid adjustment of the camber and caster of the skis. Yet another prior art arrangement for attachment of the skis to a snowmobile chassis is shown by U.S. Pat. No. 3,920,091, wherein a leaf spring and spindle are utilized. Finally, an arrangement is found in U.S. Pat. No. 4,489,954 wherein a shock absorber, which has some similarity to a MacPherson-strut type of suspension system utilized in the automotive arts, is employed to attach the skis to a snowmobile chassis. None of these typical prior art arrangements are concerned with or teach the concept of an improved spindle as taught by the instant invention, i.e., the inducement of a steering bias in the skis to toe-out.

SUMMARY OF THE INVENTION

The present invention is part of an overall inventive suspension which is further described in two copending applications which are being filed on the same date as this application. One of the copending applications is directed to a coordinated suspension for a snowmobile while the other is directed to a front suspension for a snowmobile.

In accordance with the present invention, an improved spindle arrangement is provided for a snowmobile suspension system which results in a steering bias in each of the skis. It is the novel arrangement of the attachment of each spindle to the preferred upper and lower suspension linkages of the front suspension of a snowmobile, and the manner in which the skis are attached to the lower portion of the spindles, which results in a steering bias that is the essence of this invention. This bias, which induces a steering bias in the skis to toe-out, is particularly advantageous due to an increase in rider confidence because of a greater feeling of stability and safety.

The present invention is part of a front suspension for a snowmobile which includes a pair of skis. The suspension for each ski includes a spindle constructed in accordance with the invention and upper and lower linkages of unequal dimensions which are connected by ball joints to the spindle. The spindles are inclined in the direction of travel of the snowmobile, generally at about 20 degrees to the vertical, and attached centrally side to side to the skis such that the longitudinal axis of the spindles, when projected along the length of the spindles and through the skis, establishes a steering point for each ski. The steering points are the points where the projected longitudinal axis of the spindle intersects the centerline of the bottom of each ski. The ball joints attached to each spindle are offset from the longitudinal axis of the spindle such that they are disposed between the longitudinal axis of the spindle and a vertical plane which includes the line which is the longitudinal axis of the snowmobile when the skis are pointing straight ahead. Projection of a line which passes through the centers of the ball joints, along the spindle to a point where it intersects the axis of the pin which acts as a horizontal hinge for the attachment of the ski to the spindle, and then vertically down, establishes a weight point on each ski. The weight of the snowmobile is transferred to the ball joints and along these lines to the point of intersection with the horizontal axis of the hinge pins and then downwardly to the weight points on each ski. The weight points are behind and closer to the vertical plane through the chassis than the steering points.

Accordingly, a bias is introduced into the skis by the spindle arrangement of the instant invention and is best understood by the following. A neutral line of response for each ski is established by a line connecting the respective steering point and weight point. This line is angled outwardly in the forward direction of travel of the snowmobile relative to the vertical plane which contains the longitudinal axis of the snowmobile. Accordingly, a bias or a tendency for the skis to follow this line is produced, i.e., a tendency for each ski to toe-out. This is a particularly advantageous response as the suspension for the snowmobile is deflected. Due to the fact that the skis are maintained in substantial parallelism by the steering linkages, the slight bias that is induced in the skis by the improved spindle arrangement of the instant invention creates a situation wherein the snowmobile will give the rider much more confidence and more comfortable ride when operating the snowmobile at high speed by eliminating the disconcerting feeling that can be generated when the skis of the snowmobile tend to toe-in. In prior art arrangements, the rider may have the feeling that the snowmobile wants to dive or roll over its skis when the skis toe-in.

Accordingly, it is an object of the present invention to provide an improved spindle arrangement for a snowmobile which induces a bias in the skis to toe-out such that when the skis are held substantially parallel by the steering linkages a greater stability results.

Other objects and advantages of the present invention will be apparent and understood from the following detailed description when taken in conjunction with the accompanying drawings.

BRIEF DESCRIPTION OF THE DRAWINGS

An improved spindle arrangement for a snowmobile constructed in accordance with this invention is described hereinbelow with reference to the accompanying drawing, wherein;

FIG. 4 is a simplified side view of the spindle arrangement showing a spindle in accordance with the invention and associated parts;

FIG. 5 is a simplified front view of the spindle of this invention with a ski attached thereto, the spindle broken away to show the ball joints mounted thereto; and FIG. 6 is a fragmentary view taken in the direction of arrows 6—6 in FIG. 4.

DETAILED DESCRIPTION OF THE INVENTION

Figure 1:
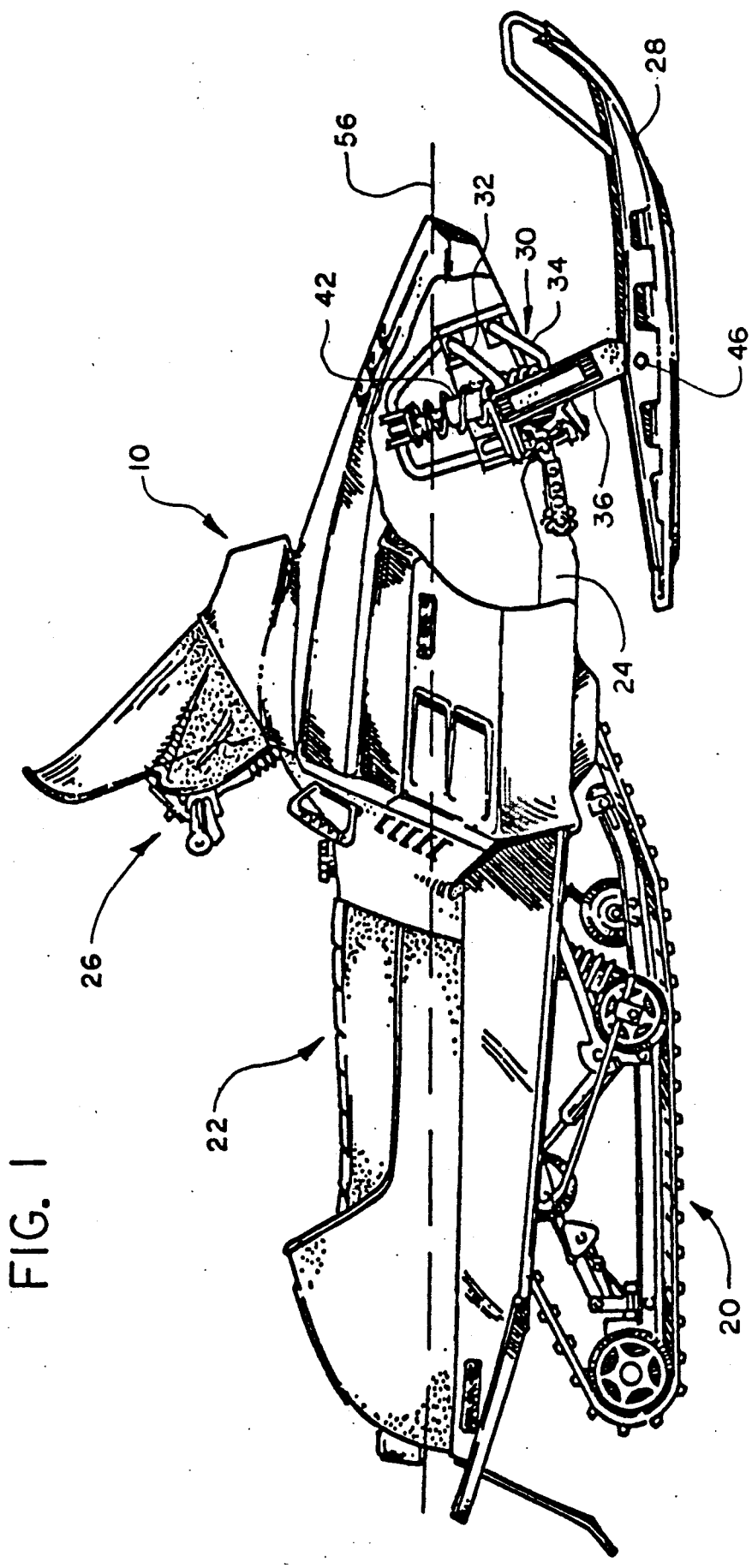
FIG. 1 is a side view of a snowmobile with a front suspension having a spindle arrangement constructed in accordance with the instant invention, a portion of the hood having been cut away to more fully illustrate the spindle and associated suspension components.

It should be noted that like reference numerals are used throughout the various views to designate similar elements or components.

Figure 2:
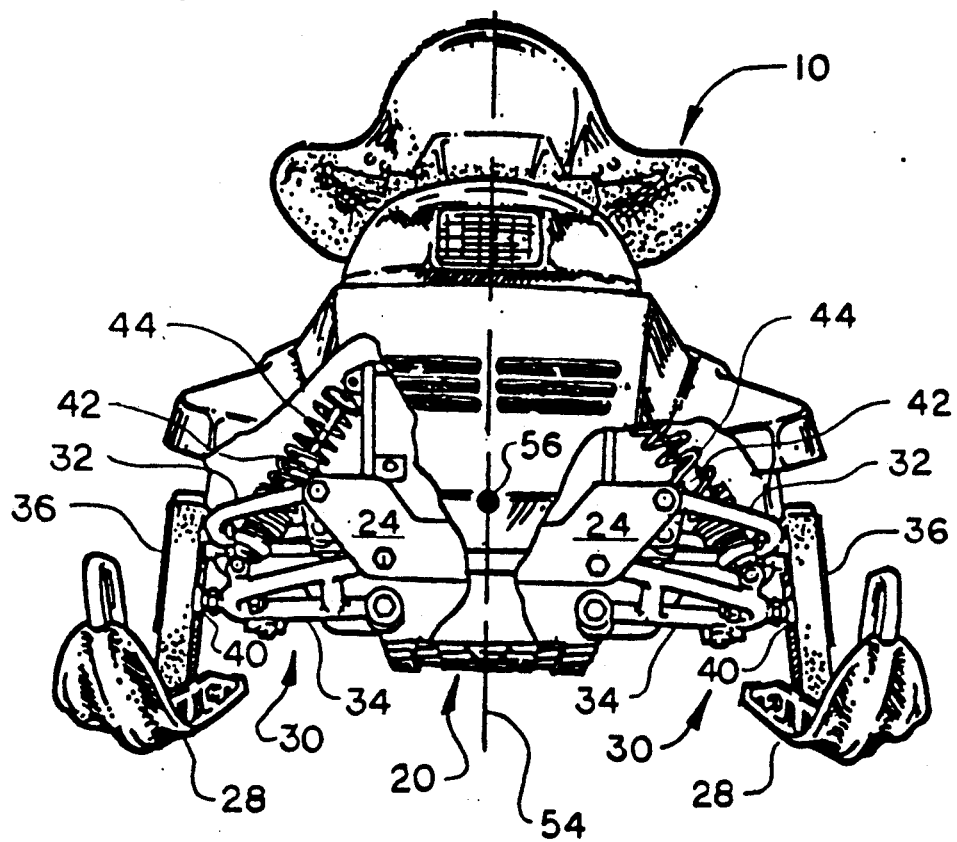
FIG. 2 is front view of the snowmobile as seen in FIG. 1 with portions of the hood broken away to better illustrate the spindle and related suspension components.

Referring now to FIGS. 1 and 2, a snowmobile 10, of the type having a forwardly mounted engine (not shown), is depicted as having a traction unit 20, a seat area 22, a chassis 24, a steering arrangement 26, a pair of skis 28, and a front suspension 30 for attachment and support of the snowmobile chassis 24 relative to skis 28.

For ease of understanding, only one side of the front suspension will be discussed in detail. It being understood that the other side is a mirror image. Accordingly, front suspension 30 includes a linkage arrangement including an upper linkage 32 generally referred to as an upper A-frame and a lower linkage 34 generally referred to as a lower A-frame. Upper and lower linkages 32, 34 interconnect the chassis 24 of the snowmobile 10 to a spindle 36 which in turn has at its lower end a ski 28 mounted thereto.

Figure 3:
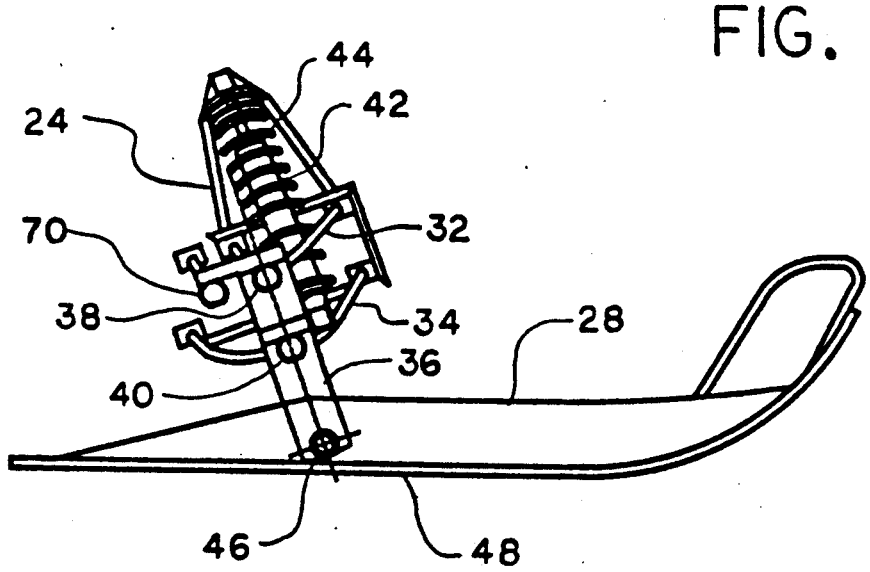
FIG. 3 is a partial perspective view of the spindle arrangement and associated ski and suspension components for one side of the snowmobile.

Referring now to FIGS. 3 and 5, spindle 36 is attached to the upper and lower linkages 32,34 by upper and lower ball joints 38,40, respectively. Ball joints 38,40 are positioned on linkages 32, 34 such that shock absorber 42 and encircling spring 44 are provided clearance. Shock absorber 42 interconnects lower linkage 34 and chassis 24. Ski 28 is connected at the lower end of the spindle 36 by a horizontally disposed hinge pin 46 which is spaced upwardly from the bottom surface 48 of the ski 28. Upper and lower linkages 32, 34, i.e. upper and lower A-frames, are unitary structures and are generally parallel to one another with upper linkage (A-frame) 32 being smaller than lower linkage (A-frame) 34. Upper linkage 32 is attached by ball joint 38 near the upper end of the spindle 36 and lower linkage 34 is attached to spindle 36 between the ends thereof.

Spindle 36 includes a longitudinal axis 50 which when projected downwardly through ski 36 establishes a steering point 52 at the point where the axis 50 intersects the bottom 48 of ski 28. Ball joints 38, 40 are attached to transverse webs 58, 60, respectively, of spindle 36 between longitudinal axis 50 and a vertical plane 54 which includes the longitudinal axis 56 of snowmobile 10. Thus, an axis 62 passing through the centers of rotation of ball joints 38,40, when projected downwardly to the horizontal axis 64 of the horizontal hinge pin 46 and from that point vertically downwardly to the bottom surface 48 of ski 28, establishes a weight point 66.

It has been found that to offset the attachment of ball joints 38,40, i.e., offset them to the inside of the longitudinal axis 50 of the spindle 36 about ⅜ths of an inch, introduces a bias into the ski which tends to have the ski want to toe-out relative to the direction of travel of the snowmobile. This is best understood by reference to FIG. 6 wherein a line 68, which is the neutral steering line for ski 28, is established by projecting a line through the projected weight point 66 and the steering point 52. These points define line 68 which is generally extending outwardly from vertical plane 54 of snowmobile 10. Thus when ski 28 is held substantially parallel to the vertical plane 54 by steering linkage 70, there is a natural bias created within ski 28 for it to want to seek the neutral line 68, i.e. the arrangement tends to bias ski 28 to toe-out.

The advantageous arrangement of this invention has the effect that when snowmobile 10 is being ridden and the front suspension 30, along with spindle 36 and ski 28, is deflected upwardly and downwardly, as undulations in the surface are encountered, especially when cornering or traversing the side of a hill, the skis will not tend to toe-in and thereby give the rider the unnerving feeling of the snowmobile tending to oversteer. Instead, the steering bias induced by the spindle arrangement for the skis to toe-out gives the rider a more stable feeling and thus a more comfortable ride.

It should be understood that other forms of the improved spindle arrangement are contemplated by the present invention and that numerous modifications may be made by those of skill in the art without departing from the scope and spirit of the invention.

I claim:

1. A spindle arrangement for a snowmobile suspension having a pair of steerable skis for supporting a front end of a snowmobile, each ski having a bottom surface and being pivotally attached on a generally horizontal axis transverse to its length to the end of a respective spindle arrangement by a generally horizontally disposed hinge pin, said snowmobile having a longitudinal axis and a chassis connected to a spindle arrangement for each ski, each respective spindle arrangement comprising:

a spindle body inclined downwardly in a direction of forward travel of the snowmobile and having a longitudinal axis;

means for attachment of the spindle body to the snowmobile chassis, said means for attachment having an axis of rotation; and pivot means for connecting the spindle body to a ski;

said axis of rotation being offset to one side of the longitudinal axis of said spindle body and inclined forwardly and downwardly in the forward direction of travel of the snowmobile, whereby projection of the longitudinal axis of the spindle to the bottom surface of the attached ski establishes a steering point and projection of the axis of rotation to the pivot means and then vertically down to the bottom of the ski establishes a weight point, wherein the weight point being off-set from the steering point thereby induces a steering bias.

2. A spindle arrangement according to claim 1 wherein said means for attachment of the spindle body to a chassis includes upper and lower linkages.

3. A spindle arrangement according to claim 2 wherein said upper and lower linkages each include a ball joint for attachment to the spindle body, centers of rotation of the ball joints forming the axis which is the axis of rotation.

4. A spindle arrangement according to claim 3 wherein the axis of rotation is disposed approximately ⅜ths of an inch from the longitudinal axis of the spindle body and is disposed between the longitudinal axis of the spindle body and a vertical plane containing the longitudinal axis of the snowmobile.

5. A spindle arrangement according to claim 3 wherein said spindle body includes a pair of transverse webs spaced along the length thereof to which respective upper and lower ball joints are attached.

6. A spindle arrangement according to claim 3 wherein said upper and lower linkages are rigid A-frames of unequal dimensions.

7. A spindle arrangement according to claim 6 wherein the axis of rotation is disposed approximately ⅜ths of an inch from the longitudinal axis of the spindle body and is disposed between the longitudinal axis of the spindle body and a vertical plane containing the longitudinal axis of the snowmobile.

8. A spindle arrangement according to claim 1 wherein a tie rod assembly is connected to the spindle body for steering the skis and maintaining the skis substantially parallel, whereby the induced steering bias causes the skis to be biased to toe-out.

9. A spindle arrangement for a snowmobile suspension having a pair of steerable skis for supporting a front end of a snowmobile, each ski having a bottom surface and being pivotally attached on a generally horizontal axis transverse to its length to an end of a respective spindle arrangement by a generally horizontally disposed hinge pin, said snowmobile having a longitudinal axis and a chassis connected to a spindle arrangement for each ski by upper and lower suspension linkages, each respective spindle arrangement comprising:

a spindle body having a longitudinal axis;
a first joint means having a point of rotation attached to said spindle body for connection of said spindle body to a respective upper suspension linkage;
a second joint means having a point of rotation attached to said spindle body for connection of said spindle body to a respective lower suspension linkage; and
pivot means for connecting the spindle body to a ski;
said points of rotation forming an axis of rotation offset to one side of the longitudinal axis of said spindle body, said spindle body being inclined from its connection to the upper suspension linkage downwardly and forwardly in the direction of forward travel of the snowmobile, whereby projection of the longitudinal axis of the spindle body downwardly through said ski to said bottom surface of said ski establishes a steering point and projection of the axis of rotation to the pivot means and then vertically down to the bottom of the ski establishes a weight point, wherein a line connecting the steering point and weight point defines a neutral line of steering wherein a steering bias is induced in the ski.

10. A spindle arrangement as in to claim 9 wherein a tie-rod is connected to the spindle body for steering the skis and maintaining the skis substantially parallel, whereby the induced steering bias causes the skis to be biased to toe-out.

* * * * *